(No Model.)
W. A. CLARK.
HUB ATTACHING DEVICE.
No. 351,495. Patented Oct. 26, 1886.
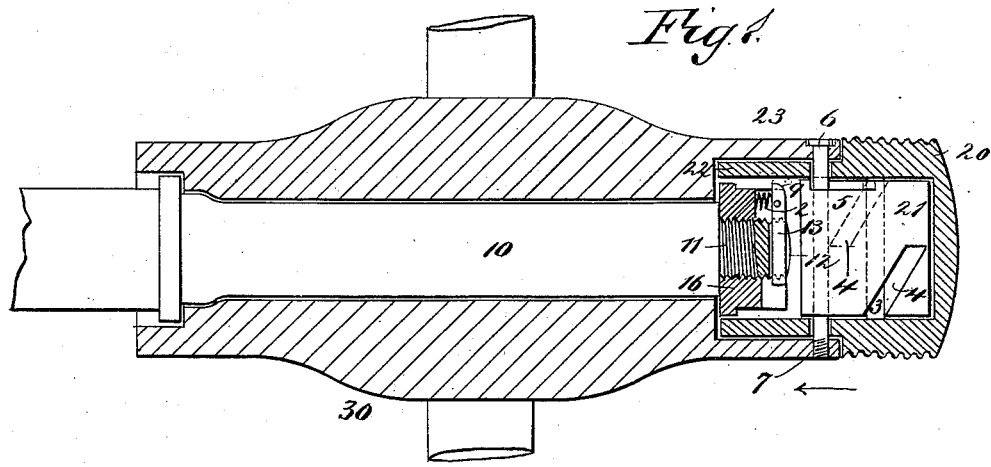
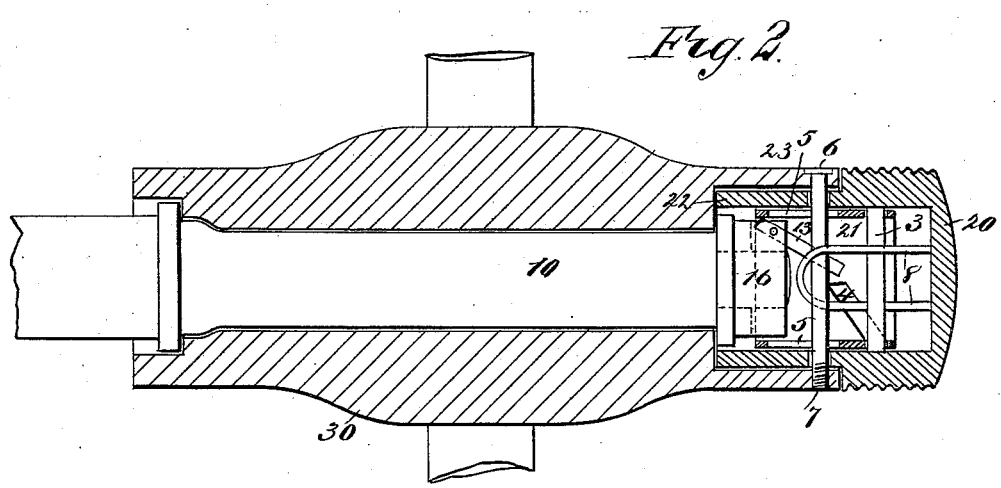
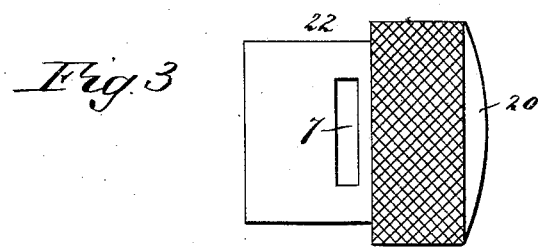
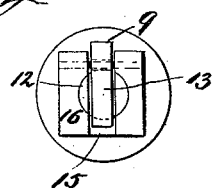
WITNESSES:
F. McArdle,
C. Sedgwick
INVENTOR:
W. A. Clark
BY Munn & Co.
ATTORNEYS.

UNITED STATES PATENT OFFICE.

WALTER ALMON CLARK, OF CHICAGO, ILLINOIS.

HUB-ATTACHING DEVICE.

SPECIFICATION forming part of Letters Patent No. 351,495, dated October 26, 1886.

Application filed April 21, 1886. Serial No. 199,668. (No model.)

*To all whom it may concern:*

Be it known that I, WALTER ALMON CLARK, of Chicago, in the county of Cook and State of Illinois, have invented a new and Improved Hub Attachment, of which the following is a full, clear, and exact description.

My present invention relates to the construction of an attachment applicable to the ordinary form of vehicle wheel and axle, but slight changes in construction being required in order to adapt the axles and hubs of the said vehicles for use in connection with my improved attachment, the object of the invention being to prevent the accidental displacement of the wheels, and to provide an attachment whereby the retaining-nuts upon the ends of the axles may be removed when it is desired to disconnect the wheel and axle.

Reference is to be had to the accompanying drawings, forming a part of this specification, in which similar figures of reference indicate corresponding parts in all the figures.

Figure 1 is a sectional view of the hub of a wheel provided with my improved attachment, the parts being shown in the locked position. Fig. 2 is a similar view representing the parts as they appear after the catch has been removed from engagement with the axle and just as the nut is about to be turned off. Fig. 3 is a detail view illustrating the construction of the cap removed from the hub; and Fig. 4 is a view of the slotted end of the axle, the retaining-nut being shown in position.

In the drawings, the axle 10, which is formed with the usual screw-thread, 11, is also provided with a slot, 12, arranged to receive a locking pin or catch, 13, that is pivotally mounted in a slot, 15, formed in the retaining-nut 16, being normally held in the position in which it is shown in Fig. 1 by a spring, 2—that is, when the slots 15 and 12 register the catch 13 will be forced within the slot 12 and will keep the nut 16 from turning upon the threaded end 11 of the axle 12.

In connection with the nut and catch described I employ a cap, 20, within which there is fitted a sliding sleeve, 21, formed with a central aperture, within which the head of the nut 16 will closely fit, the cap 20 being formed with an inwardly-projecting flange, 22, which fits within the outer annular flange, 23, of the hub 30. The sleeve 21 is formed with two inclined slots, 4 4, and through these slots there is passed a pin, 3, that is rigidly fixed to the cap 20, and in addition to the diagonal slots 4 the sleeve 21 is formed with longitudinal slots 5, that are arranged upon opposite sides of the sleeve, as best shown in Fig. 2. The cap 20 is attached and held to the hub 30 in the position in which it is shown in the drawings by a pin or bolt, 6, which passes through slots 7, formed in the flange 22 of the cap. This pin or bolt 6 passes through a U-spring, 8, the ends of which are fixed to the cap 20, as shown in Fig. 2.

Such being the construction of the attachment, it will be seen that as the cap 20 is turned to the right the sleeve 21, which is kept from turning by the pin 6, will be advanced in the direction of the arrow shown in Fig. 1, until the nut 16 has entered the bore or central recess of the sleeve, but as the sleeve advances the heel 9 of the catch 13 will be struck by the sleeve, and the catch will be moved to the position in which it is shown in Fig. 2—that is, to a position out of engagement with the slot 12—so that by giving the wheel a turn the nut 16 will be released from engagement with the threaded end of the axle. When the hub is to be reattached to its axle, the wheel is turned until the nut 16 is caught upon the threaded end of the axle. The turning of the wheel is then continued until the nut has been seated. The hub-cap is then released, and the spring 8 will act to restore the parts to the position in which they are shown in Fig. 1.

With such an attachment as has been described it will be seen that it will be impossible for the nut to become accidentally disengaged from the axle, and it will also be seen that the wheel may be removed from the axle without the necessity of handling a soiled and dirty nut; and it will also be seen that after the parts are in position the axle will be thoroughly protected from sand and grit.

Having thus fully described my invention, what I claim as new, and desire to secure by Letters Patent, is—

1. The combination, with a cap, of a sleeve formed with diagonal and longitudinal slots, a pin fixed to the cap and passing through the diagonal slots of the sleeve, a second pin or bolt passing through the longitudinal slots in the sleeve and through transverse slots in the cap, and a nut arranged to engage with the threaded end of an axle and carrying a catch formed with a heel, 9, the sliding sleeve being arranged to engage with the nut, substantially as described.

2. The combination, with a cap formed with transverse slots 7, of a sliding sleeve formed with diagonal slots 4 and longitudinal slots 5, a pin, 3, fixed within the cap and passing through the diagonal slots of the sleeve, a second pin, 6, passing through the slots 7 and 5, a torsional spring, 8, a nut, 16, having a catch, 13, pivotally mounted in a slot formed in the head of the nut, the catch 13 being formed with an outwardly-extending heel, 9, and a spring, 2, arranged in connection with the catch, substantially as described.

3. The combination, with an axle formed with a slotted end, and its hub, of a nut formed with a catch arranged to enter said end, a sliding sleeve formed with longitudinal and diagonal slots, a cap within which the sleeve is arranged, a pin, 3, fixed to the cap and passing through the diagonal slots in the sleeve, a second pin, 6, fixed to the hub and passing through transverse slots formed in the cap and the longitudinal slots formed in the sleeve, and a torsional spring, 8, fixed to the cap, substantially as described.

WALTER ALMON CLARK.

Witnesses:
FRANCIS CHAFFEE,
CHAS. H. BURROUGHS.